United States Patent
Buckley et al.

(10) Patent No.: US 8,797,954 B2
(45) Date of Patent: Aug. 5, 2014

(54) EFFICIENT SIGNALING OF DISCONTINUOUS TRANSMISSION

(75) Inventors: Michael Eoin Buckley, Grayslake, IL (US); Youn Hyoung Heo, Suwon (KR); Andrew Mark Earnshaw, Kanata (CA); Amin Mobasher, Waterloo (CA); Masoud Ebrahimi Tazeh Mahalleh, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 215 days.

(21) Appl. No.: 13/246,477

(22) Filed: Sep. 27, 2011

(65) Prior Publication Data

US 2012/0076077 A1    Mar. 29, 2012

Related U.S. Application Data

(60) Provisional application No. 61/387,265, filed on Sep. 28, 2010.

(51) Int. Cl.
*H04W 4/00* (2009.01)
*H04B 1/00* (2006.01)
*H04B 7/00* (2006.01)

(52) U.S. Cl.
USPC .............................. 370/328; 455/68; 455/511

(58) Field of Classification Search
USPC ........ 370/328–330, 335–348; 455/67.11–703
See application file for complete search history.

(56) References Cited

U.S. PATENT DOCUMENTS

2005/0265249 A1* 12/2005 Nagaraj ......................... 370/252
2005/0265250 A1* 12/2005 Gollamudi et al. ........... 370/252
2009/0129317 A1* 5/2009 Che et al. ...................... 370/328
2010/0303035 A1* 12/2010 Gao et al. ...................... 370/329
2011/0243066 A1* 10/2011 Nayeb Nazar et al. ....... 370/328

OTHER PUBLICATIONS

International Search Report and Written Opinion for PCT Application No. PCT/US2011/053474, mailed Mar. 13, 2012.
Samsung, DTX Feedback for Carrier Aggregation, 3GPP TSG RAN WG1 #62, R1-104574, Aug. 23-27, 2010.
Huawei, HARQ DTX Within the Agreed ACK/NACK Framework, 3GPP TSG RAN WG1 #60, R1-104499, Aug. 23-27, 2010.
Nokia et al., Explicit DTX Support for UL ACK/NACK Feedbacl in LTE-A TDD, 3GPP TSG RAN WG1 #62, R1-104430, Aug. 23-27, 2010.
Samsung, Need for DIA and HARQ-ACK Transmission Aspects with CA, 3GPP TSG RAN WG1 #60, R1-104576, Aug. 23-27, 2010.
Office Action issued in Japanese Application No. 2013-529456 on Jan. 17, 2014; 5 pages.
Huawei; A/N Codebook Design with DTX for Carrier Aggregation; 3GPP TSG RAN WG1 Meeting #61; R1-103088; Montreal Canada; May 10-14, 2010; 11 pages.

* cited by examiner

*Primary Examiner* — Thai Hoang
(74) *Attorney, Agent, or Firm* — Fish & Richardson P.C.

(57) ABSTRACT

Methods and devices are disclosed for efficient signaling of discontinuous transmission in a wireless communication system. In various aspects of the disclosure, a user equipment device monitors transmissions on a plurality of physical downlink control channels (PDCCHs) and, in response to said transmissions, generates an acknowledge/negative acknowledge (ACK/NACK) signal comprising a plurality of bits, wherein the plurality of bits includes a discontinuous transmission (DTX) indicator bit. In some embodiments, the indicator bit corresponds to an even or odd number of PDCCHs successfully decoded. In other embodiments, the indicator bit corresponds to an odd or even number of component carriers comprising "TRUE" NACKs.

2 Claims, 6 Drawing Sheets

EFFICIENT SIGNALING OF DISCONTINUOUS TRANSMISSION

CROSS-REFERENCE TO RELATED APPLICATIONS

This application claims priority from U.S. Provisional Patent Application No. 61/387,265, filed on Sep. 28, 2010, the disclosure of which is incorporated herein by reference in its entirety.

BACKGROUND

1. Field

The present disclosure relates in general to the field of telecommunications and, more specifically to systems and methods for signaling discontinuous transmission (DTX).

2. Description of the Related Technology

Hybrid Automatic Repeat reQuest (HARQ) is used in wireless communications to enable robust transmissions over wireless channels. Transmitted data is first encoded by a code used for error detection, followed by a code used for forward error correction (FEC). Generally, only a subset of the FEC codeword bits is sent in any single transmission attempt.

At the receiver, an attempt is made to correct errors in the received signal through use of the FEC code. If residual errors remain after FEC, the error detection code generates a retransmission request through a negative acknowledgement (NACK). When the transmitter receives a NACK, it may transmit a second (possibly different) subset of codeword bits. The receiver can then combine received data from multiple HARQ transmission attempts in order to increase the probability of a successful decoding. Conversely, if there are no residual errors after FEC, the error detection code informs the transmitter through an acknowledgement (ACK) that no further transmissions are required.

In addition to the cases discussed above, a third outcome called discontinuous transmission (DTX) is also possible. DTX occurs when the control signaling needed for the HARQ process is missed. In this case, the receiver is unaware of the data transmission and in general may not signal either a positive or a negative acknowledgement. However, in the case where the state of multiple parallel HARQ processes is signaled in a single message and control information for at least one of these processes has been received, encompassing DTX information can be explicitly signaled.

On the downlink in LTE, HARQ control information is carried by the Physical Downlink Control Channel (PDCCH), while data is carried by the Physical Downlink Shared Channel (PDSCH). In the Third Generation Partnership Project Long Term Evolution (3GPP-LTE), the three possible outcomes are: 1) DTX, i.e., no control signaling was detected on the PDCCH; 2) ACK, i.e., the user equipment (UE) was able to successfully decode both the control signaling on the PDCCH and the corresponding data transmission on the PDSCH; or 3) NACK, i.e., the UE was able to successfully decode the control signaling on the PDCCH but was not able to decode the corresponding data transmission on the PDSCH.

DTX may occur because no control signaling was sent (this may be referred to as a $DTX_{NoTx}$ event) or because the UE receiver was unable to successfully decode the PDCCH signaling (this may be referred to as a $DTX_{NoRx}$ event). While $DTX_{NoTx}$ is not considered to be an error event, $DTX_{NoRx}$ is considered to be an error event. Although the UE receiver cannot distinguish between $DTX_{NoTx}$ and $DTX_{NoRx}$ events, if the evolved node B (eNB) transmitter knows that a DTX event occurred, then the transmitter can determine whether or not it was a $DTX_{NoTx}$ or $DTX_{NoRx}$, since the transmitter knows whether or not it transmitted control signaling. Furthermore although the likelihood of $DTX_{NoRx}$ given a physical downlink control channel (PDCCH) was transmitted is dependent on network operation, a nominal value of 1% is often used as a figure of merit.

Being able to differentiate between $DTX_{NoRx}$ and NACK events at the transmitter is useful, since it assists the transmitter in selecting an appropriate power level for the PDCCH and PDSCH channels and in selecting an appropriate subset of codeword bits to send for the next HARQ transmission attempt. This can result in more efficient HARQ operation, less latency introduced by HARQ, and greater overall cell throughput. In addition, knowledge of the occurrence of one or more $DTX_{NoRx}$ events can allow the transmitter to hypothesize that it needs to transmit future HARQ control signaling with more robust encoding and/or transmit power to improve the probability of the receiver being able to successfully decode such control signaling.

In the case of time division duplexing (TDD), the UE can detect a $DTX_{NoRx}$ has occurred because of mismatch between the downlink assignment index (DAI) and the number of received PDCCHs. However, in the case of frequency division duplexing (FDD), the UE may be unaware such an event has occurred as a DAI field is not included in the PDCCH message.

At the receiver side, NACK and DTX events are similar in the aspect that transmitted data cannot be successfully decoded in either case. If data was actually sent, then an HARQ retransmission must be made in both cases if the receiver is to have any chance of decoding the corresponding data block.

From the foregoing, it is apparent that there is a significant need for efficient systems and methods for signaling DTX or for signaling information from which DTX can be concluded. Systems and methods to meet this need are provided in the disclosure discussed herein below.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
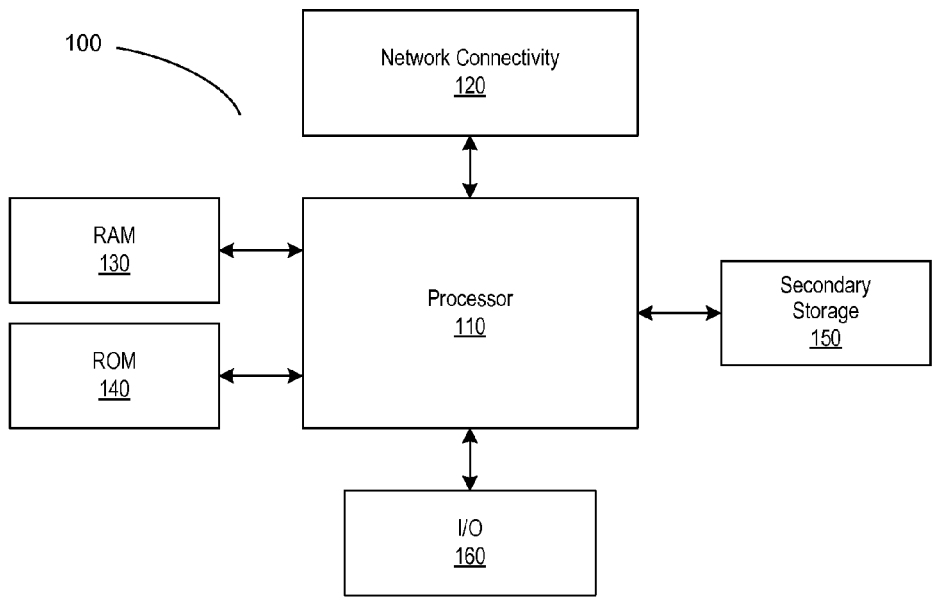
FIG. 1 is a schematic block diagram of a wireless device according to one embodiment.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the inventor's specific goals, such as compliance with process technology or design-related constraints, which may vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers, Gateway General Packet Radio Service (GPRS) Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, Worldwide Interoperability for Microwave Access (WiMAX), LTE, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
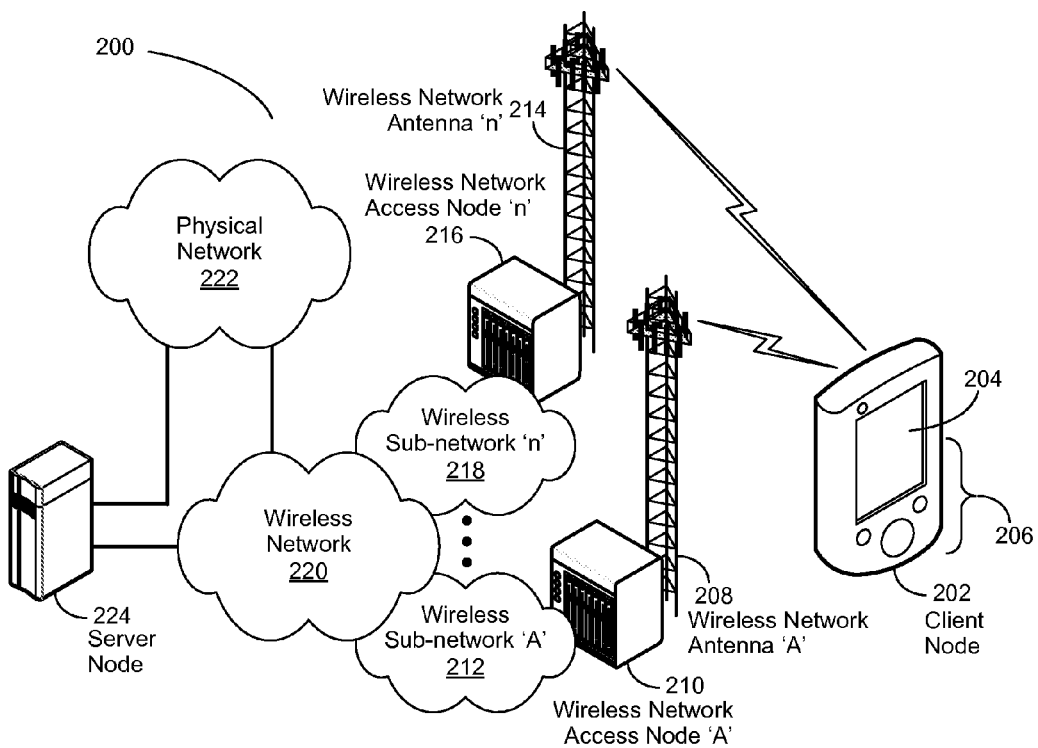
FIG. 2 shows a wireless-enabled communications environment including an embodiment of a client node.

FIG. 2 shows a wireless-enabled communications environment including an embodiment of a client node as implemented in an embodiment of the disclosure. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless network 220. Skilled practitioners of the art will recognize that many such embodiments are possible and the foregoing is not intended to limit the spirit, scope, or intention of the disclosure.

Figure 3:
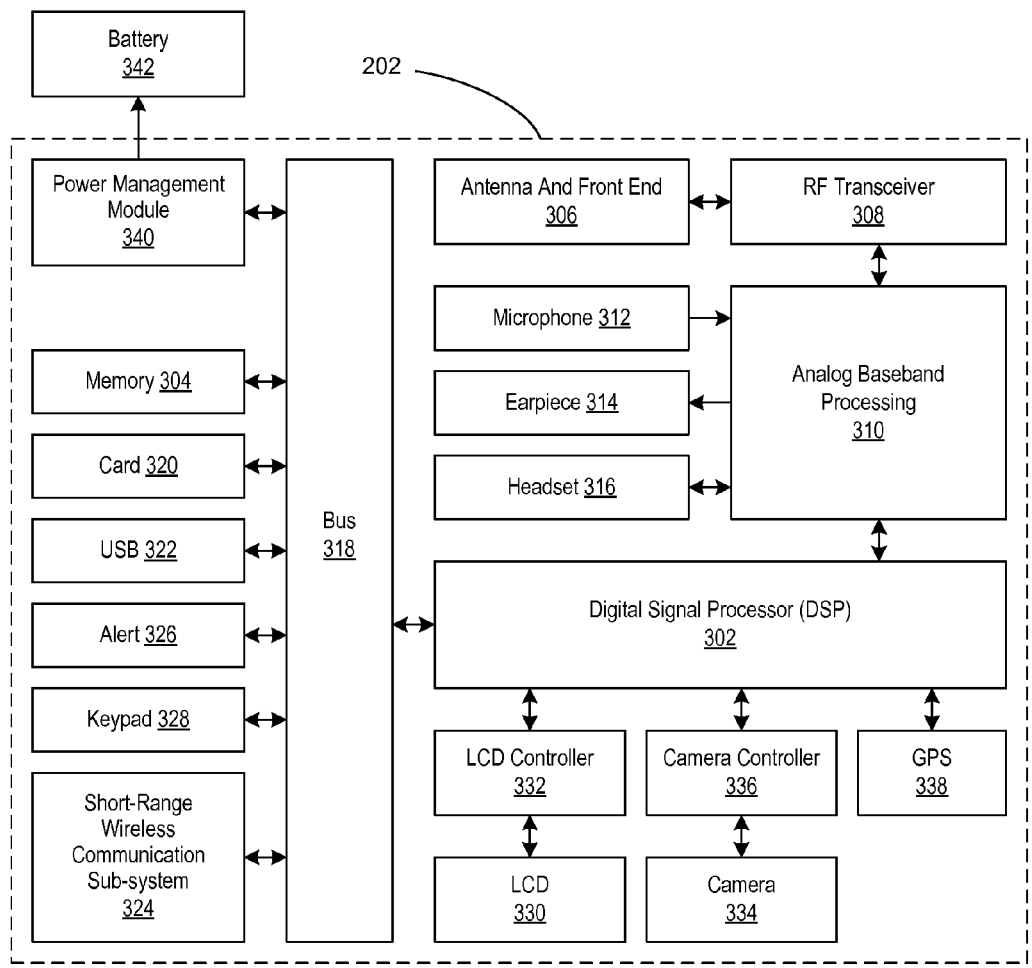
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the disclosure. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front-end unit 306 may be provided to convert between wireless signals and electrical signals, enabling the client node 202 to send and receive information from a cellular network or some other available wireless communications network or from a peer client node 202. In an embodiment, the antenna and front end unit 306 includes multiple antennas to provide spatial diversity which can be used to overcome difficult channel conditions or to increase channel throughput. As is known to those skilled in the art, multiple antennas may also be used to support beam forming and/or multiple input multiple output (MIMO) operations thereby further improving channel throughput or robustness to difficult channel conditions. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 308, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. Various other peripherals may also be included to provide additional functions, such as radio and television reception.

Figure 4:
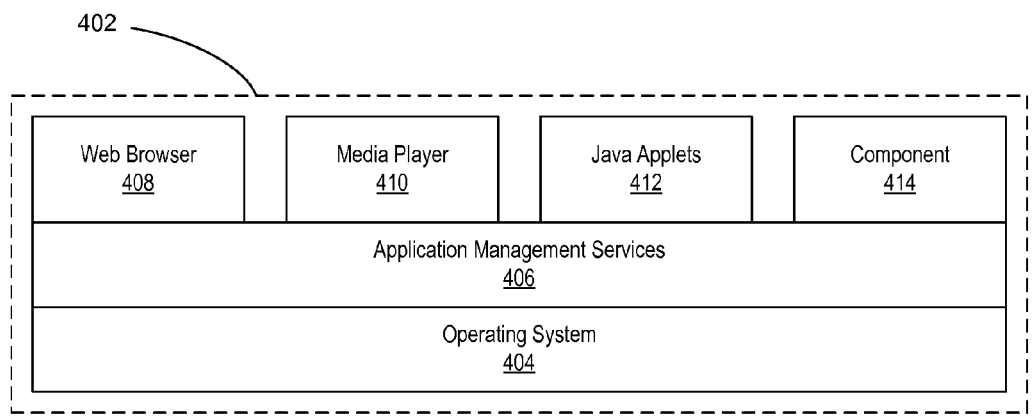
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. A component 414 may provide functionality described herein. In various embodiments, the client node 202, the wireless network nodes 'A' 210 through 'n' 216, and the server node 224 shown in FIG. 2 may likewise include a processing component that is capable of executing instructions related to the actions described above.

Figure 5:
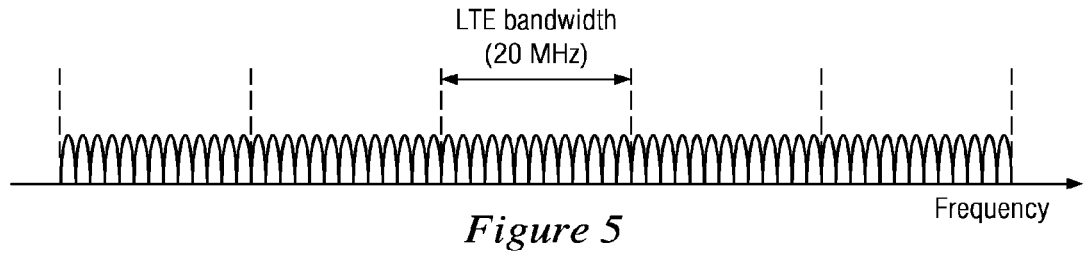
FIG. 5 is an illustration of carrier aggregation showing bandwidth for each carrier.

In 3GPP, it has been agreed that carrier aggregation will be used for LTE-Advanced (LTE-A) in order to support wider transmission bandwidths and hence increase the potential peak data rate to meet LTE-A requirements. In downlink carrier aggregation, multiple (up to a maximum of five) downlink component carriers may be aggregated, and they can be allocated in a subframe to a UE as shown in FIG. 5. In this example, each component carrier has a width of 20 MHz, and the total downlink system bandwidth is thus 100 MHz. Those of skill in the art will recognize, however, that fewer than the five downlink component carriers shown in FIG. 5 may be allocated to a particular UE and that the bandwidths of different component carriers need not necessarily be the same. The UE may receive on a multiple of up to five downlink component carriers depending on the UE's capabilities. In addition, depending on the deployment scenario, carrier aggregation may occur with carriers located in the same frequency band and/or carriers located in non-adjacent (non-contiguous) frequency bands. For example, one carrier may be located at 2 GHz and a second non-adjacent aggregated carrier may be located at 800 MHz.

Figure 6:
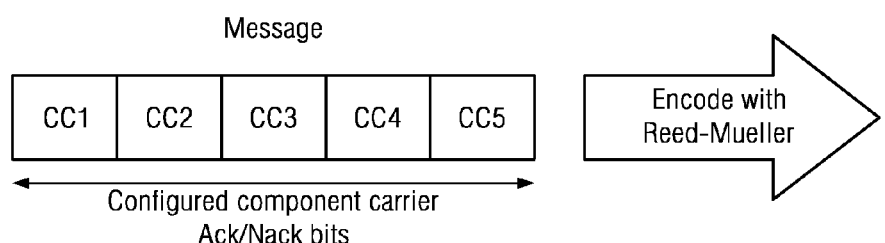
FIG. 6 is an illustration of scheduling of ACK/NACK bits for component carriers (CCs).

FIG. 6 is an illustration of prior art configured component carrier (CC) ACK/NACK bits. Current LTE proposals provide for the transmission of ACK/NACK information via a Reed-Muller code on the uplink. Instead of transmitting ACK/NACK information just for each decoded data transmission, an ACK/NACK message is transmitted for all configured CCs and data codewords. For example, if two CCs are configured for single-layer transmission, and three are configured for dual-layer MIMO, then 8 (=2×1+3×2) ACK/NACK message bits are signaled to the eNB even if only one PDCCH is received by the UE indicating PDSCH data is received on only one CC. The rule used in constructing ACK/NACK information is that an ACK is transmitted if PDSCH data is decoded correctly, otherwise a NACK is sent. A characteristic of this approach is a NACK is sent on CCs where no data is scheduled. Since the eNB knows on which CCs a PDSCH was scheduled, it can use this information to improve decoding of the Reed-Muller code by only considering whether an ACK or a NACK is encoded for CCs that were scheduled and fixing NACKs for CCs that were not scheduled. In addition, the transmission of one or two feedback bits for each carrier, regardless of whether or not PDCCH and/or PDSCH decoding was successful, allows the original transmitter (which receives the HARQ feedback) to unambiguously associate each ACK/NACK bit with a particular carrier and data block.

A disadvantage of this approach is that in many cases there is no means for the eNB to distinguish between a NACK and a $DTX_{NoRx}$. Even in the case of time division duplex (TDD) where all PDCCHs contain information detailing the number of scheduled CCs and therefore the UE may know when a $DTX_{NoRx}$ occurs, this information cannot currently be communicated to the eNB. This may result in inefficiency in the HARQ process due to transmitting an inappropriate version of the data blocks in case DTX is interpreted as a NACK.

One possible solution could be to explicitly signal DTX for each component carrier. This would introduce an additional state in each HARQ process. For example, for single layer transmission, the number of states will be three, which include ACK, NACK, and DTX. Hence, for N CCs, with single layer transmission on each CC, the proposal would result in $3^N$ possible messages. Explicit signaling, however, is inconsistent with current provisions of 3GPP-LTE Signaling ACK/NACK or DTX per component carrier (CC) does not naturally lead to a total message space with a size equal to a power of two. As a result, it is not immediately apparent how to simply map a decoded string of message bits to multiple ACK/NACK/DTX values or how to use apriori knowledge of a $DTX_{NoTx}$ in a simple and straightforward manner during decoding.

Figure 7:
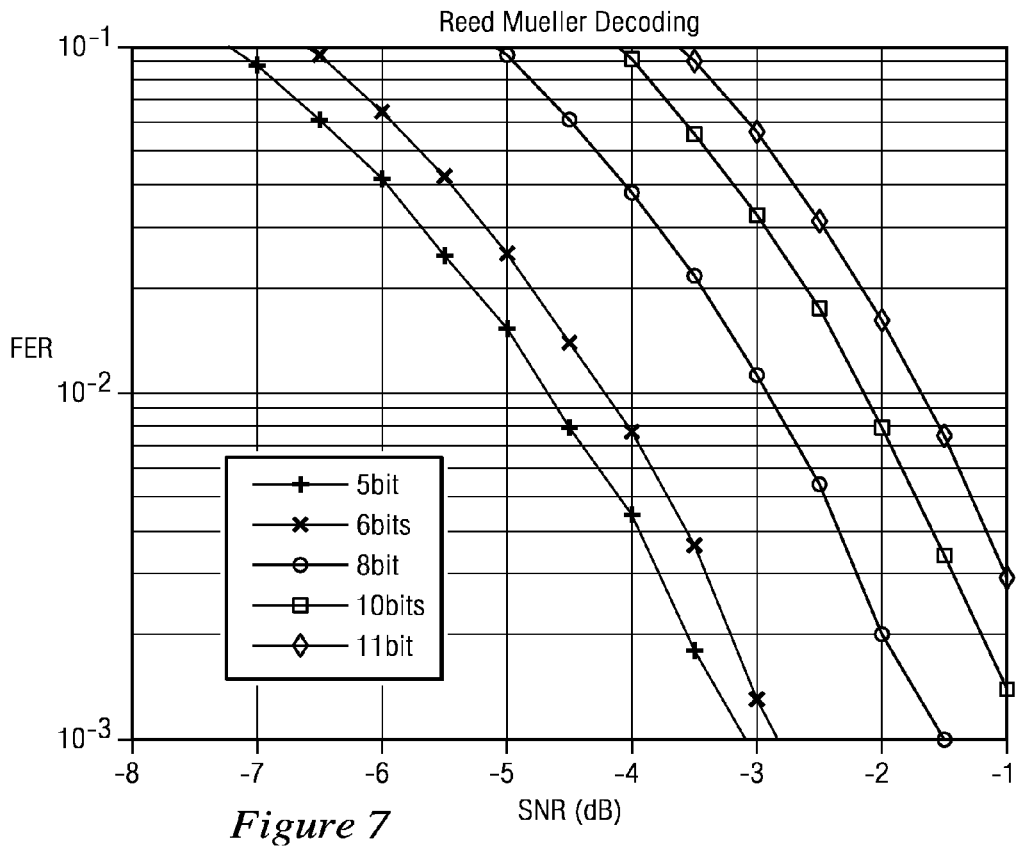
FIG. 7 is a graphical illustration of the relationship between the payload of a code and the block error rate (BLER) for a range of signal-to-noise ratios (SNRs).

As shown in FIG. 7, the greater the message payload of a code, the greater the BLER a code experiences at a given SNR. Including explicit DTX information for each of 5 single-layer component carriers can result in a payload size of 8 bits ($\log_2(3^5)\sim=8$) versus 5 bits required for signaling ACK/NACK alone resulting in a 1.7 dB loss in performance. The proposal described later requires one additional bit for a total message size of 6 bits suffering a much smaller 0.5 dB loss in performance.

Since each CC may be scheduled for one or two codewords, the required number of bits for representing all possible states (ACK/NACK/DTX) can vary from a minimum of $\lceil\log_2(3^2)\rceil=4$ (for two single-layer CCs) to a maximum of $\lceil\log_2(5^5)\rceil=12$ (for five dual-layer CCs). Therefore, a single look-up table or mapping is not easily feasible. In other words, a look-up table for each possible ACK/NACK/DTX message size would be needed.

Figure 8:
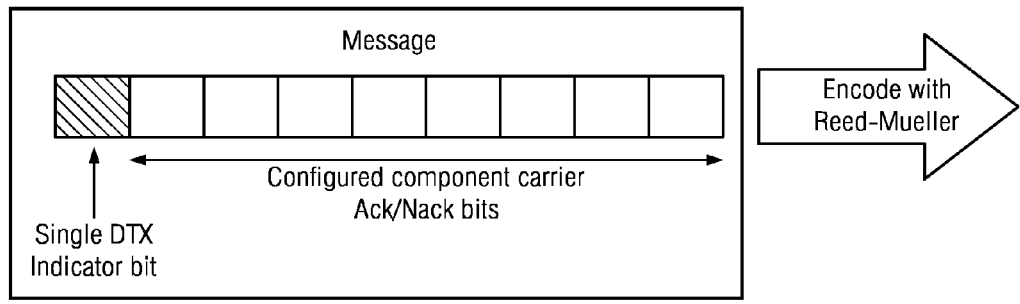
FIG. 8 is an illustration of a HARQ feedback message for signaling DTX in accordance with an embodiment.

Embodiments of the present disclosure provide efficient systems and methods for signaling DTX through the addition of DTX information to or into a block of ACK/NACK information. In some embodiments, bits for DTX signaling are substituted in place of bits normally used for other purposes in a block of ACK/NACK information. In one embodiment, a single bit indicator is used to provide an indication of the DTX state by signaling whether an odd or even number of PDCCH control channels were detected by the UE, using a single indicator bit in the HARQ feedback message as shown in FIG. 8. This bit can, for example, use a value of 0 to indicate that an odd number of PDCCH control channels were detected by the UE and a value of 1 to indicate an even number of PDCCH control channel detections (or vice versa). If the indication does not align with the number of PDCCH control channels transmitted by the eNB, then it is understood by the eNB that at least one of the decoded NACKs is in fact a DTX.

One of the benefits of this embodiment is the required overhead in signaling the DTX state is a single bit and is easily included in the Reed-Muller message. Therefore, it has a much smaller impact on the link performance of the code than explicit signaling of DTX. In the case of only one (or an odd number of) $DTX_{NoRx}$ event occurring, the eNB will always be able to detect that at least one $DTX_{NoRx}$ event occurred. This knowledge can be used by eNB to boost the power of PDCCH and/or to increase the aggregation level used for PDCCH signaling to have more reliable downlink control signaling in subsequent subframes.

Figure 9:
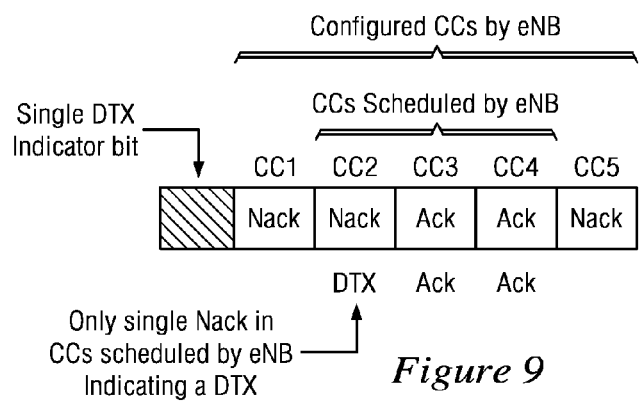
FIG. 9 is an illustration of a HARQ feedback message for signaling DTX in accordance with an embodiment, wherein the eNB can determine the exact component carrier in which a $DTX_{NoRx}$ has occurred.

In the case where $DTX_{NoRx}$ occurs and at least one ACK is signaled on each of the CCs on which data is received by the UE, then the eNB can determine the exact CC in which $DTX_{NoRx}$ has occurred. This can be understood by considering the case of single-layer transmission, such as the example of five component carriers being configured as depicted in FIG. 9. If the indicator bit indicating a DTX is present and all CCs that have been scheduled contain ACKs except for the one in which a $DTX_{NoRx}$ occurred which is the only one containing a NACK, then that NACK must be a $DTX_{NoRx}$.

As will be understood by those of skill in the art, the likelihood the CC of $DTX_{NoRx}$ can be detected is related to the probability of a NACK. Table 1 shows the probability that an eNB can accurately locate the CC where a single $DTX_{NoRx}$ has occurred for various probabilities of NACK. This example table is based on the assumption that the UE has been configured with five active CCs and a single $DTX_{NoRx}$ has occurred. As the eNB will understand the location of $DTX_{NoRx}$ only when all other scheduled CCs contain at least one ACK, the table reflects the probabilities of such an occurrence. As shown, for smaller probabilities of a NACK and for smaller numbers of scheduled CCs there is a higher likelihood of correctly identifying the CC with $DTX_{NoRx}$.

TABLE 1

| | Scheduled CCs | | | |
|---|---|---|---|---|
| P Nack | 2 CC | 3 CC | 4 CC | 5 CC |
| 0.1 | 0.90 | 0.81 | 0.73 | 0.66 |
| 0.2 | 0.80 | 0.64 | 0.51 | 0.41 |
| 0.3 | 0.70 | 0.49 | 0.34 | 0.24 |

The embodiment discussed hereinabove is implemented using a single codeword per CC. In an alternate embodiment, two data codewords are transmitted per CC. Since scheduling information for these two codewords is contained within one PDCCH only, the ambiguity between a $DTX_{NoRx}$ and NACK in a CC can only exist if NACKs are sent by the UE for both data codewords. Table 2 shows the probability of the eNB correctly determining the location of a $DTX_{NoRx}$ in the case of dual-layer transmission. As successful decoding between data codewords is correlated, results are shown assuming example correlation values (Pcorr) of 80% and 20% between codewords in a CC.

TABLE 2

| | | Scheduled CCs | | | |
|---|---|---|---|---|---|
| P Nack | Pcorr | 2 CC | 3 CC | 4 CC | 5 CC |
| 0.1 | 0.8 | 0.92 | 0.85 | 0.78 | 0.72 |
| | 0.2 | 0.98 | 0.96 | 0.94 | 0.92 |
| 0.3 | 0.8 | 0.76 | 0.58 | 0.44 | 0.33 |
| | 0.2 | 0.94 | 0.88 | 0.83 | 0.78 |

In another embodiment, the UE can be configured to use a single indicator bit to signal whether an odd or even number of CCs contain TRUE NACKs (i.e. PDSCH decoded in error). If there is a mismatch between the odd/even number of CCs containing TRUE NACKs signaled by the UE and the actual number of PDCCHs transmitted by the eNB, then it is understood by the eNB that at least one of the decoded NACKs is a $DTX_{NoRx}$. In this embodiment, the total number of CCs containing at least one TRUE NACK is simply counted without regarding to whether or not individual TRUE NACKs are present on a single- or dual-codeword CC.

In another embodiment, the UE uses a single indicator bit to signal whether an odd or even number of TRUE NACKs are contained in the message. If there is a mismatch between the odd/even number of TRUE NACKs signaled by the UE and the actual number of signaled NACKs (some of which may actually represent DTX) decoded by the eNB, then it is understood by the eNB that at least one of the decoded NACKs is a $DTX_{NoRx}$. In this solution, the total number of TRUE NACKs in the HARQ feedback message is simply counted without regard to whether or not individual TRUE NACKs are present on a single or dual-codeword CC. In this embodiment, the eNB will not understand $DTX_{NoRx}$ has occurred if the UE misses exactly one PDCCH on a dual-codeword CC.

In another embodiment, the UE signals whether an odd or even number of potentially-ambiguous CCs containing TRUE NACKs are contained in the message. That is, only CCs containing TRUE NACKs that are not otherwise distinguishable from signaled DTX events are counted. In the case of a CC using dual-codeword transmission, both HARQ feedback bits must be TRUE NACKs in order for that CC to be counted towards the number of CCs containing TRUE NACKs whereas in the case of single layer transmission, the single HARQ feedback bit must be a TRUE NACK in order for that carrier to be counted towards the number of CCs containing TRUE NACKs.

As illustrated in Table 3 below, there are four possible ACK/NACK combinations in the case of a dual-codeword CC. If only one NACK (and one ACK) is signaled, then that NACK is unambiguously known to be a TRUE NACK, and is therefore not included in the count of CCs containing TRUE NACKs. Conversely, if two NACKs are sent for a particular dual-layer carrier, then that signaling could represent either two TRUE NACKs (neither PDSCH transport block could be successfully decoded) or a DTX event. In this latter case, the CC counts towards the number of CCs containing TRUE NACKs if both of the signaled NACKs represent TRUE NACKs and not a DTX event.

TABLE 3

| Transport Block 1 | Transport Block 2 | Result |
|---|---|---|
| ACK | ACK | |
| ACK | NACK | The NACKs for these two events are known to be TRUE NACKs, since they are present with an ACK (i.e. since a transport block was successfully decoded, the UE is known to have successfully decoded the control channel signaling. |
| NACK | ACK | |
| NACK | NACK | This event could either represent two TRUE NACKs (both transport blocks could not be decoded) or a DTX. |

Another embodiment provides for an additional single DTX indicator bit to specify whether the signaled HARQ feedback contains an odd or even number of CCs containing NACKs that actually represent DTX events. In this embodiment, based on the first embodiment discussed herein above, the UE signals whether an odd or even number of PDCCH control channels were not detected by the UE across the total number of carriers being monitored. In this embodiment, any dual-codeword carrier for which a DTX event was being signaled would only contribute a count of 1 towards the total number of CCs containing NACKs representing DTX events (even though two NACKs would be signaled for those dual-codeword carriers).

In another embodiment, a 1-bit flag is used to indicate whether the number of DTX events at the receiver for the subframe corresponding to the HARQ feedback message is greater than or less than or equal to a specified threshold ($T_1$). This threshold may be: 1) a function of the number of active CCs; 2) a function of the number of signaled NACKs (some of which may represent TRUE NACKs and some of which may represent DTX) included in the same HARQ feedback message; or 3) be zero.

In another embodiment, a single bit is used for signaling, with the information conveyed by that bit representing a function of the number of NACKs included in the same HARQ feedback message. An additional embodiment of this innovation would be to use the 1-bit flag (i.e., the information it signals) to vary as a function of the number of NACKs signaled in a particular HARQ feedback message. For example, if the number of signaled NACKs was less than or equal to a particular threshold ($T_2$), then the flag could specify whether an odd or even number of DTX events occurred. Conversely, if the number of signaled NACKs is greater than the same threshold, then the flag could specify whether or not at least one DTX event occurred.

In another embodiment, single bit signals are used as an indicator of agreement between DAI and number of PDCCH control channel detections. In this embodiment, a single DTX indicator bit is added to the ACK/NACK message. This bit indicates whether there is alignment at the UE between DAI indications carried on received PDCCH control channels and the number of PDCCHs transmitted on the downlink. If there is no alignment, then the eNB knows a DTX has occurred. This solution is operable in TDD mode where the DAI field exists on the PDCCH.

In another embodiment of the disclosure, an N-bit flag is used to indicate the number of detected CCs in DTX. In the case of five CCs configured for a two-bit flag, the number of flags will indicate the number of CCs on which a PDCCH was not detected. In the more general case, assuming the UE only signals feedback, if a PDCCH is received on at least one of M configured carriers then:

N=1 bit is sufficient for M=2 or 3 component carriers
N=2 bits can be used for M=4 or 5 component carriers
N=3 bits can be used for M=6 to M=9 component carriers.

The proposed systems and methods disclosed herein offer numerous advantages of prior methods for signaling. The required overhead in signaling the DTX state is a single bit and is easily included in the Reed-Muller message. This embodiment has a much smaller impact on the link performance of the code than full signaling of DTX. For example, in the case of an odd number of $DTX_{NoRx}$, the eNB can deduce a DTX has occurred. With some non-zero probability, the eNB can deduce the location of the DTXed CC.

Having an indicator bit for DTX helps eNB to apply power control and/or code rate modification (via the aggregation level being used) on PDCCH. If eNB deduces a $DTX_{NoRx}$ has occurred, but does not know in which CC, it may needlessly expend power/resource increases on non-problematic CCs. However if the eNB can deduce the location of the DTXed CC, it can focus on increasing the power/resources in the problematic CC only.

Figure 10:
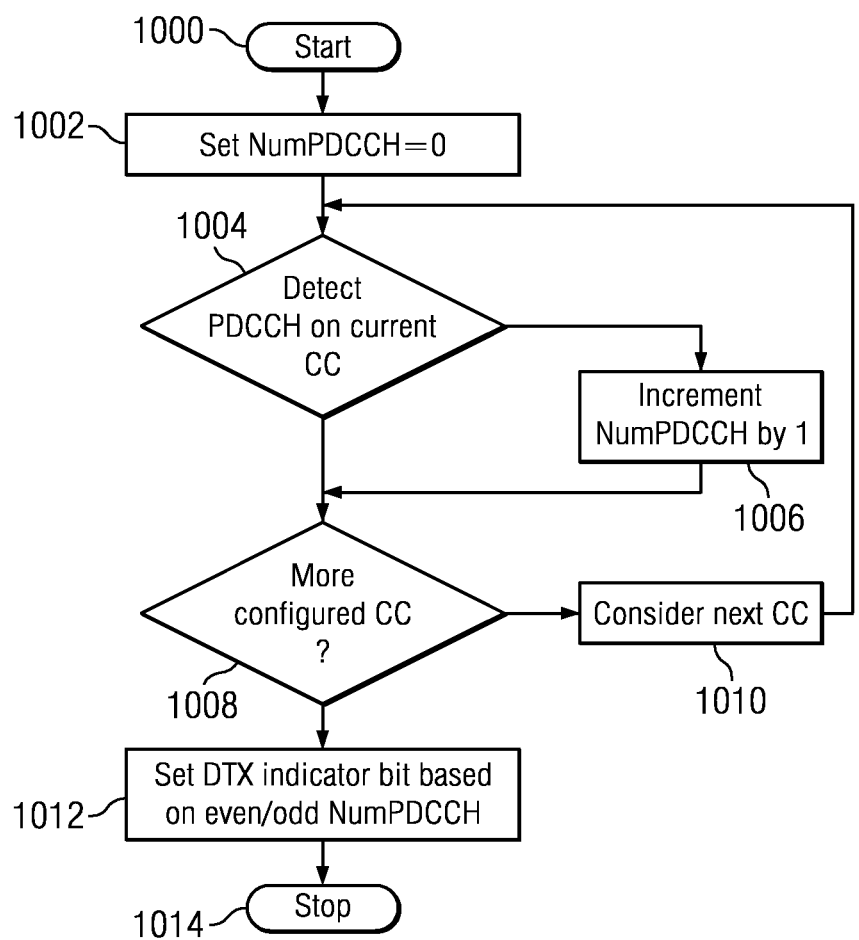
FIG. 10 is a flowchart illustration of a method for determining an appropriate DTX signal in accordance with an embodiment.
Figure 11:
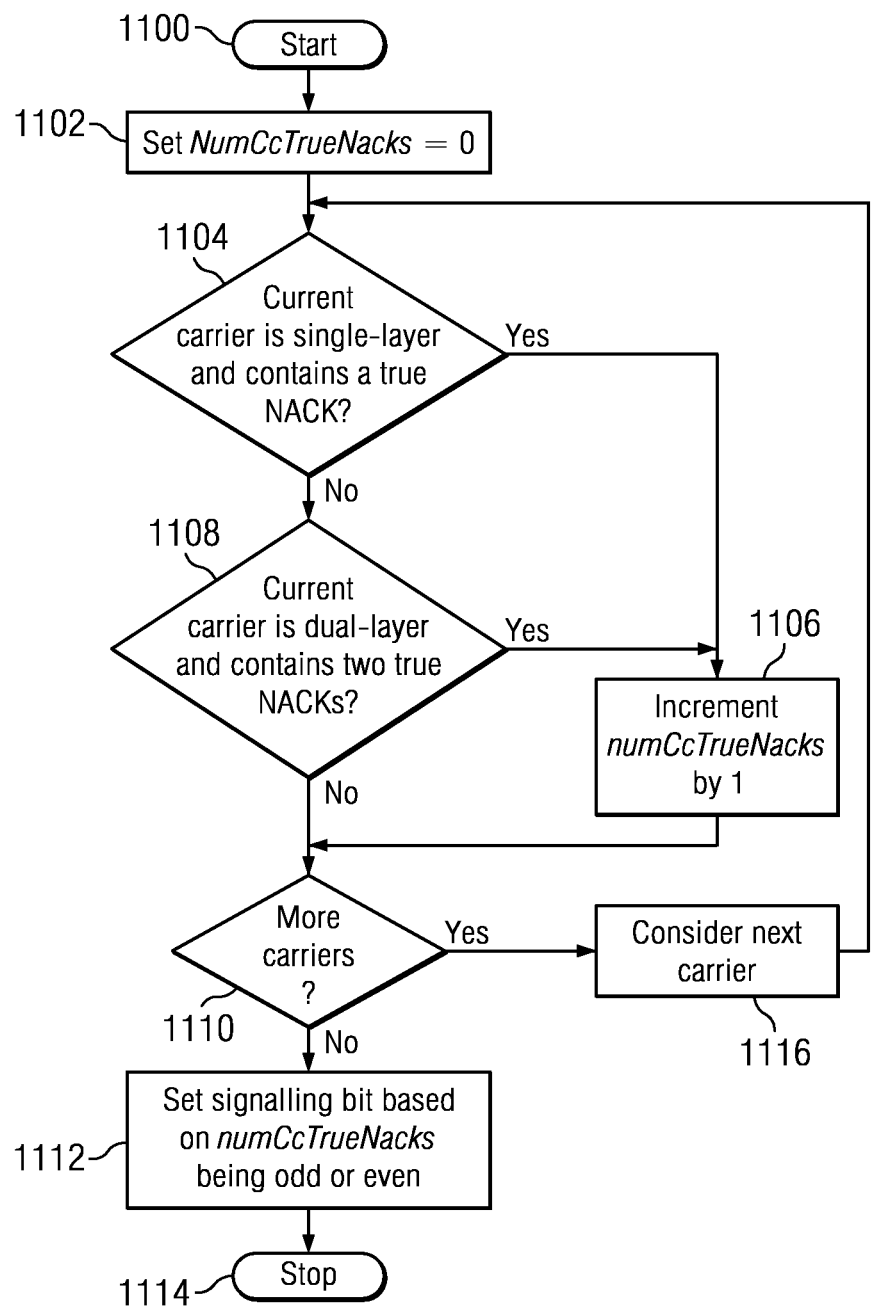
FIG. 11 is a flowchart illustration of a method for determining an appropriate DTX signal based on the total number of potentially ambiguous component carriers having known NACKs.

FIG. 10 is a flowchart illustration of a method for determining an appropriate DTX signal in accordance with embodiments of the disclosure disclosed hereinabove. In step 1000 processing is initiated and the number of PDCCHs is then set to "0" in step 1002. In step 1004 a test is conducted to determine whether a PDCCH has been detected on the current CC. If the result of the test conducted in step 1004 indicates that a PDCCH has been detected on the current CC, the number of PDCCHs is incremented by "1" in step 1006 and processing proceeds to step 1008. If, however, the result of the test conducted in step 1004 indicates that no PDCCH has been detected on the current CC, processing proceeds directly to step 1008 where a test is conducted to determine whether there are additional CCs that are operationally configured. If the result of the test conducted in step 1008 indicates that there are additional configured CCs, processing proceeds to step 1010 where the next CC is considered and processing then proceeds to step 1004, as discussed above. If however, the result of the test conducted in step 1008 indicates that there are not any additional configured CCs, processing proceeds to step 1012 where the DTX indicator bit is set to "1" or "0," based on the current number of PDCCHs detected FIG. 11 is a flowchart illustration of a method, in accordance with embodiments disclosed hereinabove, for determining an appropriate DTX signal based on the total number of potentially ambiguous component carriers having known NACKs. In step 1100, processing is initiated and, in step 1102, the number of CC TRUE NACKs is set to "0" in step 1102. In step 1104, a test is conducted to determine whether the current carrier under consideration is single layer and contains a TRUE NACK. If the result of the test in step 1104 indicates that the current carrier is single layer and contains a TRUE NACK, processing proceeds to step 1106 where the number of CCs with TRUE NACKs is incremented by "1," and processing then proceeds to step 1110. If, however, the result of the test conducted in step 1104 indicates that the current carrier is not single layer and does not contain a TRUE NACK, processing proceeds to step 1108 where a test is conducted to determine whether the current carrier is dual layer and contains two TRUE NACKs. If the result the test conducted in step 1108 is "YES," processing proceeds to step 1106, where the number of CCs with TRUE NACKs is incremented by "1." If, however, the result of the test conducted in step 1108 is "NO," processing proceeds to step 1110 where a test is conducted to determine whether there are more carriers to be considered. If the result of the test conducted in step 1110 indicates that there are more carriers to be considered, processing proceeds to step 1116, where the next carrier is considered and processing then proceeds to step 1104, as discussed above. If however, the result of the test conducted in step 1110 indicates that there are no additional carriers to be considered, processing proceeds to step 1112, where the signaling bit is set to "1" or "0," depending on the current number of CCs with TRUE NACKs, and processing is then ended in step 1114.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the terms "user equipment" and "UE" can refer to wireless devices such as mobile telephones, personal digital assistants (PDAs), handheld or laptop computers, and similar devices or other user agents ("UEs") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present disclosure has been described in detail, it should be understood that various changes, substitutions and alterations can be made hereto without departing from the spirit and scope of the disclosure as defined by the appended claims.

What is claimed is:

1. A method for operating a user equipment in a wireless communication network, the method comprising:

monitoring, by the user equipment, transmissions on a plurality of physical downlink control channels (PDCCHs); and in response to said transmissions, generating, by the user equipment, an acknowledge/negative acknowledge (ACK/NACK) signal comprising a plurality of bits, wherein the plurality of bits includes a discontinuous transmission (DTX) indicator bit;

wherein the DTX indicator bit corresponds to one of:

(a) an odd or even total number of NACKs corresponding to PDSCH coding failures but not including any NACKs corresponding to failure to successfully decode a PDCCH;

(b) an odd or even number of component carriers where all of the HARQ feedback bits for a component carrier consists of NACKs corresponding to a PDSCH decoding failure;

(c) an odd or even number of HARQ feedback bits corresponding to the decoding failure of the associated data codeword;

(d) an odd or even number of PDCCHs successfully decoded, if the number of NACKs is less than or equal to a threshold, and whether or not at least one NACK corresponds to failure to successfully decode a PDCCH otherwise;

(e) a bit to be combined with additional (log2(M-1))-1 bits, wherein M is the number of component carriers, and wherein the combination of bits indicates a number of component carriers for which a PDCCH was not successfully decoded.

2. A client node for use in a wireless communication network, comprising:

processing logic configured to:

monitor transmissions on a plurality of physical downlink control channels (PDCCHs); and in response to said transmissions, generate an acknowledge/negative acknowledge (ACK/NACK) signal comprising a plurality of bits, wherein the plurality of bits includes a discontinuous transmission (DTX) indicator bit; and wherein the DTX indicator bit corresponds to one of:

(a) an odd or even total number of NACKs corresponding to PDSCH coding failures but not including any NACKs corresponding to failure to successfully decode a PDCCH;

(b) an odd or even number of component carriers where all of the HARQ feedback bits for a component carrier consists of NACKs corresponding to a PDSCH decoding failure;

(c) an odd or even number of HARQ feedback bits corresponding to the decoding failure of the associated data codeword;

(d) an odd or even number of PDCCHs successfully decoded, if the number of NACKs is less than or equal to a threshold, and whether or not at least one NACK corresponds to failure to successfully decode a PDCCH otherwise;

(e) a bit to be combined with additional (log2(M-1))-1 bits, wherein M is the number of components carrier, and wherein the combination of bits indicates a number of component carriers for which a PDCCH was not successfully decoded.

* * * * *